(12) United States Patent
Ambati et al.

(10) Patent No.: US 12,361,093 B2
(45) Date of Patent: Jul. 15, 2025

(54) EMBEDDED PREDICTIVE MACHINE LEARNING MODELS

(71) Applicant: H2O.ai Inc., Mountain View, CA (US)

(72) Inventors: Srisatish Ambati, Palo Alto, CA (US); Tom Kraljevic, San Jose, CA (US); Pasha Stetsenko, Mountain View, CA (US); Sanjay Joshi, Kirkland, WA (US)

(73) Assignee: H2O.ai Inc., Mountain View, CA (US)

( * ) Notice: Subject to any disclaimer, the term of this patent is extended or adjusted under 35 U.S.C. 154(b) by 1374 days.

(21) Appl. No.: 15/939,652

(22) Filed: Mar. 29, 2018

(65) Prior Publication Data

US 2018/0293462 A1 Oct. 11, 2018

Related U.S. Application Data

(60) Provisional application No. 62/479,968, filed on Mar. 31, 2017.

(51) Int. Cl.
| | | |
|---|---|---|
| *G06F 18/213* | (2023.01) | |
| *G06F 16/25* | (2019.01) | |
| *G06F 16/84* | (2019.01) | |
| *G06F 16/907* | (2019.01) | |
| *G06N 5/022* | (2023.01) | |
| *G06N 20/00* | (2019.01) | |

(52) U.S. Cl.
CPC ............ *G06F 18/213* (2023.01); *G06F 16/86* (2019.01); *G06F 16/907* (2019.01); *G06N 5/022* (2013.01); *G06N 20/00* (2019.01); *G06F 16/258* (2019.01)

(58) Field of Classification Search
CPC ...... G06K 9/6232; G06N 20/00; G06N 5/022; G06F 16/258; G06F 18/213; G06F 16/907; G06F 16/86
See application file for complete search history.

(56) References Cited

U.S. PATENT DOCUMENTS

| | | | |
|---|---|---|---|
| 2006/0106797 A1* | 5/2006 | Srinivasa | G06F 16/2465 |
| 2007/0073770 A1* | 3/2007 | Morris | G06F 16/258 |
| 2008/0040362 A1* | 2/2008 | Aucouturier | G06F 16/58 |
| 2010/0058305 A1* | 3/2010 | Jones | G06F 9/4484 717/162 |
| 2010/0146050 A1* | 6/2010 | Grieder | G06F 40/151 709/204 |
| 2013/0325759 A1* | 12/2013 | Rachevsky | G10L 15/063 706/12 |
| 2014/0088989 A1* | 3/2014 | Krishnapuram | G16H 50/50 705/2 |
| 2016/0217387 A1* | 7/2016 | Okanohara | G06N 20/00 |
| 2017/0091673 A1* | 3/2017 | Gupta | G06N 5/022 |
| 2017/0316343 A1* | 11/2017 | Shamsi | G06F 11/3495 |

FOREIGN PATENT DOCUMENTS

CA 2812118 3/2012

* cited by examiner

*Primary Examiner* — Markus A. Vasquez
(74) *Attorney, Agent, or Firm* — Van Pelt, Yi & James LLP (57) ABSTRACT

Data associated with one or more data sources is transformed into a format associated with a common ontology using one or more transformers. One or more machine learning models are generated based at least in part on the transformed data. The one or more machine learning models and the one or more transformers are provided to a remote device.

16 Claims, 4 Drawing Sheets

EMBEDDED PREDICTIVE MACHINE LEARNING MODELS

CROSS REFERENCE TO OTHER APPLICATIONS

This application claims priority to U.S. Provisional Patent Application No. 62/479,968 entitled EMBEDDED PREDICTIVE MACHINE LEARNING MODELS filed Mar. 31, 2017 which is incorporated herein by reference for all purposes.

BACKGROUND OF THE INVENTION

Information associated with an entity (e.g., individual, business, device, machine, etc.) may be stored across a plurality of databases. The manner in which the information associated with an entity is stored in a first database, i.e., an ontology, may not necessarily be the same as the manner in which the information is stored in one or more other databases. For example, one database may identify an individual by the individual's social security number while a second database may identify the same individual by the individual's driver's license number. Another database may identify the individual's birthdate as Jan. 1, 2000 while another database may identify the individual's birthdate as 01/01/00. As a result, these inconsistencies make it difficult to combine the information associated with the entity from a plurality of databases into a single database.

Machine learning is a field of computer science that gives computers the ability to learn without being explicitly programmed. A computer may include a machine learning model that can be trained to implement a complex function that is configured to generate one or more predictions based on a set of inputs. The trained machine learning model is configured to act like a black box: it receives production data, the production data is applied to the complex function, and one or more prediction labels are outputted.

However, the accuracy of the trained machine learning model is limited by the data used to train the machine learning model. Training the machine learning model to output an accurate prediction label may be difficult when the data used to train the machine learning model is stored across a plurality of databases with different ontologies.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A computing device may be configured to implement a machine learning model. The machine learning model may be trained to output a prediction based on a set of input data. The set of input data is comprised of a plurality of entries. Each entry is associated with a plurality of features having corresponding feature values. Each entry may be associated with a corresponding prediction label. The set of input data may be sorted into training data and validation data. Training data may be used to train a machine learning model. The machine learning model may be tuned to better match the prediction labels associated with the training data. For example, one or more weights associated with the one or more features included in the machine learning model may be dynamically tuned to improve the accuracy of the machine learning model. Validation data included in the set of input data may be used to validate the trained machine learning model. In the event the machine learning model has an accuracy above a threshold accuracy, the machine learning model is ready for use with production data. Otherwise, the machine learning model is retrained and revalidated to produce a more accurate machine learning model.

After a machine learning model is trained and validated, production data may be applied to the machine learning model. However, such an application assumes the production data includes the same features that were used to train/validate the machine learning model and the features have corresponding values that are the same type and/or format as the feature values that were used to train/validate the machine learning model. As a result, the machine learning model may not output an accurate prediction in the event the production data does not comply with the ontology that was used to train/validate the machine learning model.

An embedded predictive machine learning model that is compatible with a plurality of data types and/or formats is disclosed.

Data may be accumulated from a plurality of sources. In some embodiments, data may be received from multiple types of devices (e.g., IoT devices, sensors, medical devices, etc.). The data may include time series data associated with a device. One or more metadata features may be generated from the time series data. Features, for example, heart rate, heart rate variation, PQRST slope, etc., may be generated based on the time series data associated with an ECG device (e.g., amplitude vs time). The time series data outputted by a device may be associated with an entity (e.g., patient, individual, company, etc.). For example, the ECG device may be connected to a patient and the time series data may be identified as being the patient's data. In some embodiments, a person may be identified based on the time-series data that is outputted by the device.

In some embodiments, data is received from a plurality of different databases. The plurality of different databases may use different ontologies to store the data. For example, one database may store location data using GPS coordinates while another database may store location data using address information. Inconsistent data ontologies make it difficult to combine data from a plurality of databases into a single database because it is difficult to determine whether an entry of a first database is the same entry of a second database or a different entry. For example, information associated with a patient may be stored in a database associated with a first insurance provider. The patient may switch insurance providers. When a patient visits a medical professional associated with a second insurance provider, the patient's information may be stored in a database associated with the second insurance provider. Combining the patient information that is stored in the database associated with the first insurance provider and the patient information that is stored in the database associated with the second insurance provider into a single database may be difficult because both databases may store the same type of data, but not necessarily in the same format. For example, the database associated with the first insurance provider may store the name of the patient in a "first name last name" format while the database associated with the second insurance provider may store the name of the patient in a "last name, first name, middle initial" format. A first database may store the social security number of an individual in a "123456789" format while a second database may store the social security number of the individual in a "123-45-6789" format.

The data associated with a plurality of databases may be combined to generate a combined dataset. Inconsistent data ontologies also make it difficult to combine data from a plurality of databases into a single database because it is difficult to determine whether a feature associated with an entry of a first database is the same feature associated with an entry of a second database. For example, an entry associated with a first database and an entry associated with a second database may both store location data, but the format of the feature values are different. The entry associated with the first database may store a complete address (e.g., street, city, state, zip code) and the entry associated with the second database may only store zip code information.

Inconsistent data ontologies make it difficult to perform machine learning on a combined dataset because an entry associated with an entity may have more than one entry in the combined dataset and the feature values associated with a feature may be stored using inconsistent formats. A machine learning machine may be generated at least in part by transforming the data associated with a plurality of databases to a common ontology. One or more transformers may be applied to data to transform the data to a common format. For example, the name information associated an entry may be converted from "last name, first name, middle initial" to a "first name last name" format. The social security number information associated with an entry may be converted from a "123-45-6789" format to a "123456789" format. Converting identification information associated with an entry into a common format identifies entries across a plurality of databases that are capable of being merged. Entries with the same identification may be merged by combining features associated with a first database with features associated with one or more other databases. For example, an entry associated with a first database may include the features such as "name, social security number, age, occupation, salary, political affiliation." An entry associated with a second database may include the features such as "name, social security number, height, weight, sex, age." The features of the first database and second database may be merged into a single entry that includes the features "name, social security number, age, occupation, salary, political affiliation, height, weight, sex." In some embodiments, the features associated with an entry may be combined with feature metadata generated from time-series data of a device. For example, the features associated with an entry may include "name, social security number, age, occupation, salary, political affiliation, height, weight, sex, heart rate, heart rate variation, PQRST slope."

One or more transformers may be applied to feature values to transform the feature values to a common format to ensure a machine learning model is trained on consistent feature values. For example, a first database may have feature values associated with a location feature stored as GPS coordinates. A second database may have feature values associated with a location feature stored as a five digit zip code. If the first database were combined with the second database, some of the entries would have GPS coordinates for a location feature while some of the entries would have a five digit zip code as a feature value. The GPS coordinates may be converted to a five digit zip code. When the first database is combined with the second database to generate a combined dataset, each of entries will have a five digit zip code as a feature value for the location feature. Converting the database data using a common ontology enables the machine learning model to be trained on consistent feature values.

One or more transformers may be applied to the combined dataset to generate one or new features. A transformation performs an operation on one or more features to create a new feature. For example, a transformation may perform an operation that combines the features values associated with two different features to create a new feature. The transformation may be selected based on a data type associated with a feature value. A data type associated with a feature value may be a float value, an integer value, an ordinal value, a categorical value, a string, etc. A transformation may use a string as an input and a feature that has a string value for a feature value may be selected and transformed. The transformation may be randomly selected.

In some embodiments, a feature of the plurality of features is selected. In other embodiments, a feature not included in the plurality of features is selected. The selected feature is a feature for which a machine learning model will be trained to predict a corresponding feature label (e.g., feature value).

A set of features and corresponding feature values are selected and used to train a machine learning model. In some embodiments, the set of features includes one or more features included in the combined dataset. In other embodiments, the set of features includes at least one of the one or more new features. In other embodiments, the set of features includes a combination of the one or more features included in the combined dataset and at least one of the one or more new features.

The combined dataset may be sorted into training data and validation data. A machine learning model may be generated using a machine learning algorithm, such as decision trees, naïve bayes classification, least squares regression, logistic regression, support vector machines, neural networks, deep learning, gradient boosting machine, generalized linear model, mathematical average, etc. In some embodiments, the machine learning model is configured to output a prediction label associated with one of the features included in the combined dataset. In other embodiments, the machine learning model is configured to output a prediction label associated with an entry of the dataset (e.g., entry is exhibiting abnormal behavior, entry is associated with heart disease). In other embodiments, the machine learning model is configured to output a prediction label associated with a feature not included in the combined dataset. For example, a feature not included in the dataset may be "maximum speed." However, the dataset may include "make" and "model" features. A machine learning model, given a set of features and corresponding feature values, may be configured to predict the "maximum speed" associated with an entry.

A machine learning model is trained using a subset of the combined dataset (e.g., training data) that is comprised of a plurality of entries having a set of features and corresponding feature values. An entry of the combined dataset may have an associated prediction label. A machine learning model may be tuned to better match the prediction labels associated with the training data. For example, one or more weights associated with the one or more features included in the machine learning model may be dynamically tuned to improve the accuracy of the machine learning model.

Validation data included in the combined dataset may be used to validate a trained machine learning model. The validation data may verify the accuracy of the trained machine learning model. A machine learning model may undergo one or more iterations of training/validation until a threshold validation score (e.g., accuracy) is reached.

The trained and validated machine learning model and associated transformers may be provided to a remote device. The remote device may execute an application and store data associated with the application. The application may not be configured to make one or more predictions and the data associated with the application may not be stored using an ontology that is consistent with the ontology associated with the trained and validated machine learning model. Re-writing the application to perform predictions may require a lot of resources (e.g., time, money, etc.) and may be an inefficient use of resources because it is difficult to predict the types of future inquiries that an application user may have. Changing the manner in which the data associated with the application is stored may be difficult because it would also require re-writing the application to output data in a format that is consistent with the common ontology.

Providing the trained and validated machine learning model and its associated transformers may provide a solution because the provided machine learning model may be embedded within the application and enable the application to make predictions for which the application was previously not configured without having to re-write the application. Providing the transformers allows the data associated with the application to be converted to a format that is useable by the machine learning model without having to re-write the application.

Figure 1:
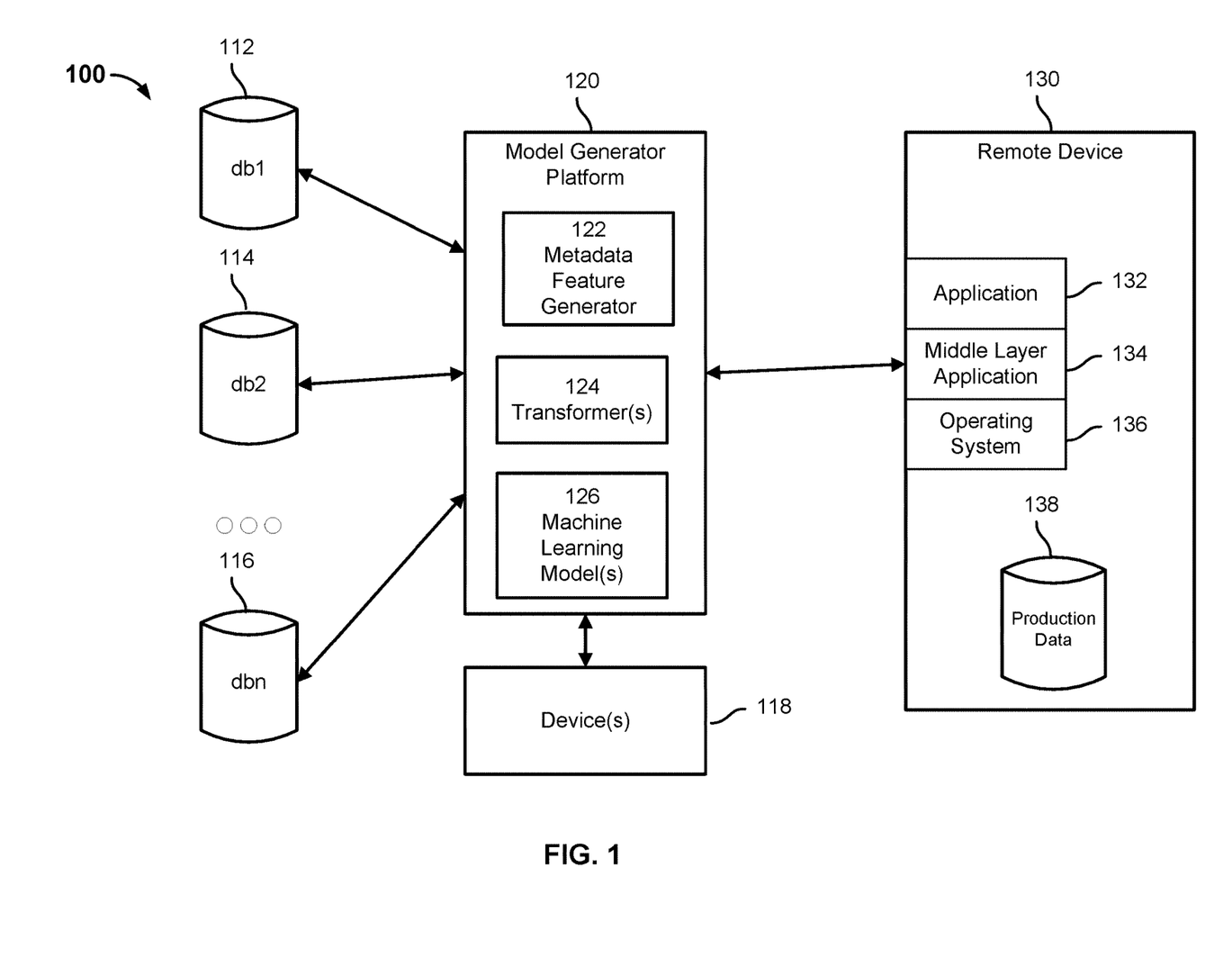
FIG. 1 is a block diagram illustrating an embodiment of a system for embedded predictive machine learning models.

FIG. 1 is a block diagram illustrating an embodiment of a system for embedded predictive machine learning models. In the example shown, system 100 includes databases 112, 114, 116, device(s) 118, a model generation platform 120, and remote device 130.

Databases 112, 114, 116 are configured to store data associated with a plurality of entities. An entity may be, for example, a person, a bank, a financial institution, a business, a hospital, a government agency, a machine, a device, an airline, etc. The data associated with an entity may be semi-structured or structured. The data associated with an entity may be comprised of a plurality of entries. For example, a database may store medical records associated with a plurality of patients. Each entry may be associated with a plurality of features and corresponding feature values. For example, an entry may be associated with the features "name, address, date of birth, sex, weight, height, blood pressure, temperature" having feature values of "John Smith, 123 Main St., 01/01/00, M, 180 lbs., 72 inches, 120:80, 99."

Database 112 may be configured to store data using a first ontology. Database 114 may configured to store data using a second ontology. Database 116 may be configured to store data using an nth ontology. An ontology describes data associated with an entity in a particular manner. In some embodiments, the manner in which data is described by an ontology is different than the manner in which data is described by another ontology. For example, database 112 may be configured to store data using metric units while database 114 may be configured to store data using English units. In some embodiments, the manner in which data is described by an ontology is the same as the manner in which data is described by another ontology. For example, database 114 and database 116 may both be configured to store "birth date" information in a "MM/DD/YYYY" format.

Data associated with databases 112, 114, 116 may be provided to model generation platform 120. In some embodiments, the data is provided on a periodic basis (e.g., daily, weekly, monthly, etc.) In other embodiments, the data is provided in response to a request from model generation platform 120.

Databases 112, 114, 116 may be connected to model generation platform 120 via a network connection. The network connection may comprise one or more of the following: a local area network, a wide area network, a wired network, a wireless network, the Internet, an intranet, or any other appropriate communication network. Databases 112, 114, 116 may be stored using one or more servers, one or more computing devices, one or more storage devices, and/or a combination thereof.

Device(s) 118 may be configured to provide time-series data to model generation platform 120. The time-series data may be associated with an entity. An entity may be, for example, a person, a bank, a financial institution, a business, a hospital, a government agency, a machine, a device, an airline, etc. A device may be an ECG device and provide time-series data associated with a patient. A device may be an IoT device and provide time-series data associated with the device (e.g., thermostat, light bulb, door lock, refrigerator, vehicle, implant device, pacemaker, etc.). A device may be a sensor that outputs time-series data. For example, the sensor data may include a temperature sensor value, a proximity sensor value, an inductive sensor value, a capacitance value, a photoelectric value, an ultrasonic sensor value, an acceleration sensor value, a brightness sensor value, a pressure sensor value, a force value, a water quality value, a conductivity sensor value, a turbidity sensor value, a total organic carbon sensor value, a chlorine residual sensor value, a pH sensor value, a chemical sensor value, a gas sensor value, a carbon dioxide sensor value, a breathalyzer value, a carbon monoxide sensor value, a catalytic bead sensor value, a hydrogen sensor value, an air pollution sensor value, a nitrogen oxide sensor value, an oxygen sensor value, an ozone monitor value, an electrochemical gas sensor value, a hygrometer value, a smoke sensor value, an infrared sensor value, an image sensor, a motion detector sensor, a gyroscope sensor value, a humidity sensor value, an optical sensor value, etc.

Device(s) 118 may be connected to model generation platform 120 via a network connection. The network connection may comprise one or more of the following: a local area network, a wide area network, a wired network, a wireless network, the Internet, an intranet, or any other appropriate communication network.

Model generation platform 120 may be comprised of one or more solid state drives, one or more hard disk drives, cloud storage, or a combination thereof. Model generation platform 120 may include one or more processors coupled to the storage drives and configured to store input data in storage (not shown). Model generation platform 120 is comprised of metadata feature generator 122, transformers 124, and one or more machine learning models 126.

Model generation platform 120 is configured to receive data from databases 112, 114, 116 and device(s) 118.

Metadata feature generator 122 is configured to generate one or more metadata features based on time-series data that is received from device(s) 118. For example, time-series data may be received from an ECG device. Metadata feature generator 122 may generate one or more metadata features associated with the time-series data, such as, heart rate, heart rate variation, PQRST slope, etc. The generated metadata features and corresponding feature values may be associated with an entity and stored at model generation platform 120.

Transformer(s) 122 are configured to transform data associated with a plurality of databases into a common ontology. A common ontology is specified such that data associated with the plurality of databases is described in a consistent format. This allows a machine learning model to be generated using data from a plurality of different data sources and ensures that the machine learning model is trained using feature values that are in a consistent format. Transformer(s) 122 may include one or more transformers that transform data to a common format. For example, transformer(s) 122 may include a transformer to convert name information associated with an entry from a "last name, first name, middle initial" format to a "first name last name" format. This transformer may enable entries from a plurality of databases to be combined into a single entry because the entries may be associated with the same entity. As a result, the number of entries of the combined dataset may be reduced. The feature values associated with a feature may be analyzed to determine a data type and/or format associated with a feature. In some embodiments, a transformer to be applied to the feature values associated with a feature is selected based on the data type and/or format of a feature value associated with a feature. For example, a feature value of a feature may be in a string format. A transformer that is configured to transform strings may be applied to the feature value. In other embodiments, a transformer is not applied to a feature value associated with a feature because the feature is already in a format associated with the common ontology.

For example, a database may store a "weight" feature in "pounds" and the common ontology uses "pounds" for a "weight" feature. In some embodiments, a transformer is selected based on a source of the data. For example, a first transformer may be applied to data associated with a first source of data and a second transformer may be applied to data associated with a second source of data. In some embodiments, a transformer is selected for a particular feature value based on a source of the data. For example, a first transformer may be applied to the feature values associated with a feature of data received from a first source and a second transformer may be applied to the feature values associated with the feature of data received from a second source.

Transformer(s) 122 are configured to generate one or more new features. A transformer may perform an operation on one or more features to create a new feature. The transformer may be selected based on a data type associated with a feature value of the one or more important features. A data type associated with a feature value may be a float value, an integer value, an ordinal value, a categorical value, a string, etc. A transformer may use a string as an input and a feature that has a string value for a feature value may be selected. The transformer may be randomly selected. In some embodiments, a feature may undergo a transformation to generate a new feature. In other embodiments, a plurality of features may undergo a transformation to generate a new feature.

The transformers may include a filter transformer, a frequent transformer, a bulk interactions transformer, a truncated SVD numeric transformer, a cross validation target encoding, cross validation categorical to numeric encoding transformer, a dates transformer, a date polar transformer, a text transformer, a categorical target encoding transformer, a numeric to categorical target encoding transformer, a cluster target encoding transformer, a cluster distance transformer, a weight of evidence, and/or a numeric to categorical weight of evidence transformer. The filter transformer counts each numeric value in the dataset. The frequent transformer counts each categorical value in the dataset. This count can be either the raw count or the normalized count. The bulk interactions transformer will add, divide, multiply, and/or subtract two columns in the feature dataset. The truncated singular value decomposition (SVD) numeric transformer trains on a selected numeric columns in the dataset. The components of the truncated SVD will be new features. The cross validation target encoding is done on a categorical column. The cross validation categorical to numeric encode transformer converts a categorical column to a numeric column. Cross validation encoding is done on the categorical column. The dates transformer retrieves any data values (e.g., year, quarter, month, day, day of year, week, week day, hour, minute, second, etc.) into a numeric value. The date polar transformer expands the date using polar coordinates. The date transformer will only expand the date into different units, for example month. This does not capture the similarity between the months December and January (12 and 1) or the hours 23 and 0. The polar coordinates capture the similarity between these cases by representing the unit of the data as a point in a cycle. The polar transformer may combine a polar transform with a time series filter to produce a Rose curve or a Lissajous curve. The text transformer transforms a text column using TFIDF (term frequency-inverse document frequency) or count (count of the word). This may be followed by dimensionality reduction using truncated SVD. The categorical target encoding transformer may perform cross validation target encoding on a categorical column. The numeric to categorical target encoding transformer converts a numeric column to categorical by binning. Cross validation target encoding is done on the binned numeric column. The cluster target encoding transformer clusters selected columns in the data and target encoding is done on the cluster ID. The cluster distance transformer clusters selected columns in the data and the distance to a chosen cluster center is calculated. A weight of evidence creates likelihood type of features using the weights of evidence (WOE) transformation method. The weight of evidence tells the predictive power of an independent variable in relation to the dependent variable.

The combined dataset may be sorted into training data and validation data. Model generation platform 120 may be configured to generate a plurality of machine learning models 126 based on the training data. A machine learning model may be generated using a machine learning algorithm, such as decision trees, naïve bayes classification, least squares regression, logistic regression, support vector machines, neural networks, deep learning, etc. A machine learning model may be trained using the same set of features as another machine learning model, but use a different machine learning algorithm. A machine learning model may be trained using the same machine learning algorithm as a different machine learning model, but trained using a different subset of features.

The machine learning model is configured to output a prediction label associated with one or more entries of the combined dataset (e.g., entry is exhibiting abnormal behavior, entry is associated with heart disease). In some embodiments, the machine learning model is configured to output a prediction label associated with a feature included in the combined dataset. In some embodiments, the machine learning model is configured to output a prediction label associated with a feature not included in the combined dataset. For example, a feature not included in the dataset may be "maximum speed." However, the dataset may include "make" and "model" features. A machine learning model, given a set of features and corresponding feature values, may be configured to predict the "maximum speed" associated with an entry.

A machine learning model is trained using a set of features and corresponding feature values. In some embodiments, the set of features includes a subset of the features included in the combined dataset. In some embodiments, the set of features includes one or more new features that are based on the one or more features included in the combined dataset. The one or more new features may be generated by transformer(s) 124. The set of features used to train a first machine learning model may overlap with all, some, or none of the features associated with the set of features used to train a second machine learning model. A machine learning model may be trained using the same set of features as another machine learning model, but use a different machine learning algorithm. A machine learning model may be trained using the same machine learning algorithm as a different machine learning model, but trained using a different set of features.

In some embodiments, the one or more entries of the training data have an associated prediction label. A machine learning model may be tuned to better match the prediction labels associated with the training data. For example, the predicted label associated with an entry determined by one of the machine learning models 127 may be compared to the prediction label associated with the entry that is included in the input data. The machine learning model may be retrained based on the comparison, for example, to fine tune the machine learning model to make a more accurate prediction. In some embodiments, one or more weights associated with the machine learning model are dynamically tuned to improve the accuracy of the machine learning model. For example, one or more weights associated with the one or more features included in the machine learning model may be tuned to improve the accuracy of the machine learning model.

In some embodiments, the one or more entries of the validation data have an associated prediction label. The validation data is comprised of a plurality of entries associated with a plurality of features and corresponding feature values. The validation data may verify the accuracy of the trained machine learning model. A machine learning model may undergo one or more iterations of training/validation until a threshold validation score (e.g., accuracy) is reached.

A validation score of a machine learning model may be determined by computing the difference between the predicted feature label and the actual feature value for an entry. The validation score of the machine learning model for an entry (e.g. accuracy for the entry) may be determined as:

$$\text{Validation Score} = \left(1 - \frac{\text{Predicted Value} - \text{Actual Value}}{\text{Actual Value}}\right) \times 100 \quad (1)$$

The overall validation score of the machine learning model for all the entries (e.g., overall accuracy) may be determined as:

$$\text{Overall Validation Score} = \frac{\Sigma \text{Validation Score for each Entry}}{\text{\# of Entries}} \quad (2)$$

The overall validation score may be compared to a threshold validation score. In the event the overall validation score is greater than or equal to the threshold validation score, the machine learning model is retained and stored at model generation platform 120. In the event the overall validation score is less than the threshold validation score, the machine learning model is retrained.

Model generation platform 120 may be configured to provide one of the machine learning models 126 and associated transformers 124 to remote device 130. The machine learning model and associated transformers may be provided in response to a request. Model generation platform 120 is configured to store a plurality of machine learning models. The request may be for a machine learning model that is configured to make a particular prediction. The machine learning model that is configured to make the particular prediction and its associated transformers may be retrieved from memory and/or storage and provided to remote device 130.

Remote device 130 may comprise one or more servers, one or more computing devices, one or more storage devices, and/or a combination thereof. Remote device may be a server, a mobile device, a computer, a laptop, a mobile phone, a tablet, a wearable device, a personal digital assistant, etc. Remote device 130 may include an application 132, a middle layer application 134, an operating system 136, and production data 138. Model generator platform 120 may provide one of the machine learning models 126 and associated transformers 124 to middle layer application 134 via an API associated with middle layer application 134 (e.g., Intersystems Cache). The machine learning model and associated transformers may be provided in a model object optimized (MOJO) file. The MOJO file may be created using a MOJO model interchange mechanism, which allows all of the model's data to be saved into a single file. A code library and associated language bindings may be provided with the machine learning model and associated transformers.

In response to receiving a machine learning model, its associated transformers, and a code library and associated language bindings, remote device 130 may store the machine learning model, its associated transformers, and the code library and associated language bindings. The machine learning model may be loaded into application 132 using the code library. This enables application 132 to provide one or more predictions using the machine learning model. Providing a code library and associated language bindings with the machine learning model and associated transformers may enable any application to be compatible with the machine learning model so that the application may be configured to make a prediction to which was previously incapable. In some embodiments, application 132 is written in a different computer language than a programming language associated with the machine learning model. The set of language bindings bridge the programming languages of the application and the code library so that the code library written in the second programming language can be used in the first programming language.

Application 132 may implement one or more MOJO reader backends, which are services capable of reading MOJOs from a variety of sources (e.g., a file system, a network, a database, resource archive, etc.). Application 132 may implement a MOJO reader service, whose purpose is to decode the MOJO file and instantiate a new model instance.

Production data 138 includes one or more entries associated with one or more entities. For example, production data 138 may include medical record data associated with a plurality of patients. The one or more entries are associated with one or more features having corresponding feature values. Production data 138 is stored using an ontology associated with remote device 130. The ontology associated with the electronic records system is different than the common ontology associated with the machine learning model.

Remote device 130 may analyze the production data to determine a data type and/or format associated with the corresponding feature values associated with one or more features of the production data. Remote device 130 may select a transformer to apply based at least in part on the data type and/or format associated with the feature values of the production data. In some embodiments, remote device 130 does not select a transformer to apply to the feature values associated with a feature of the production data because the feature values are already in a format associated with the common ontology. In some embodiments, a transformer is selected based on a context of the production data.

Figure 2A:
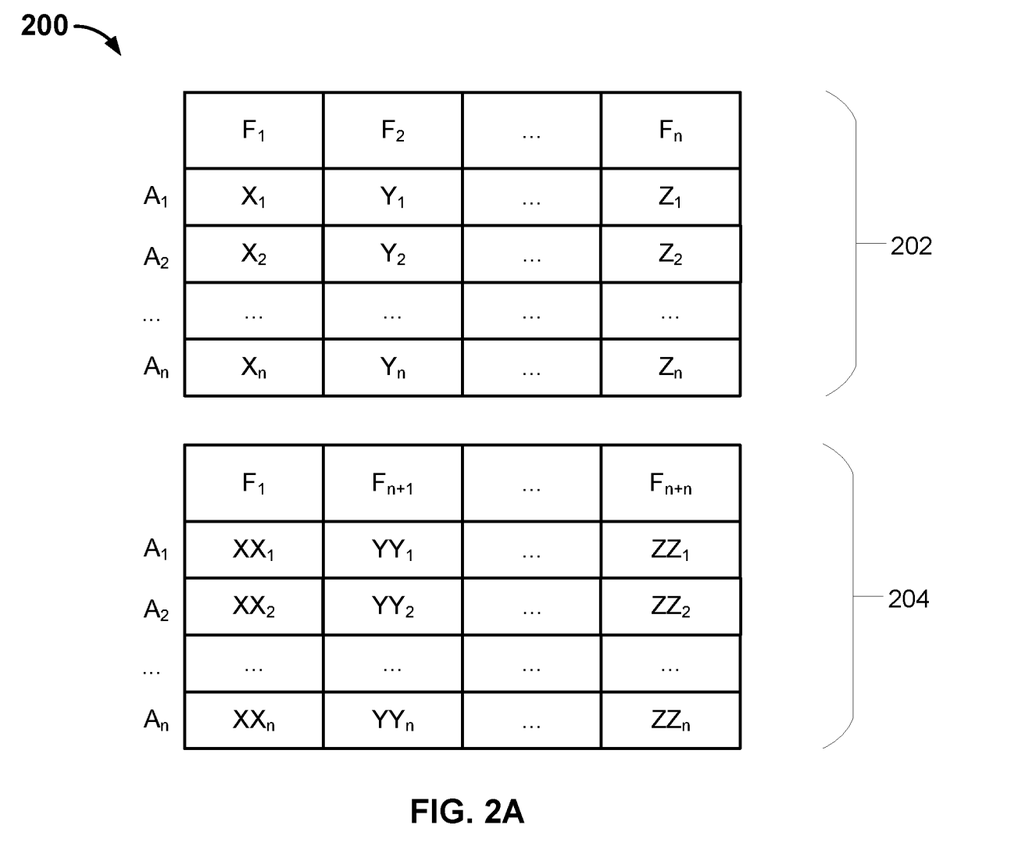
FIG. 2A is a diagram illustrating an embodiment of an input dataset.

FIG. 2A is a diagram illustrating an embodiment of an input dataset. Input dataset 200 is comprised of a first dataset 202 and a second dataset 204. Input dataset 202 may be stored by a database, such as database 112. Input dataset 204 may be stored by a database, such as database 114.

In the example shown, first dataset 202 includes entries $A_1, A_2 \ldots A_n$. Each entry is comprised of one or more features having a corresponding feature value. For example, entry $A_1$ is comprised of features $F_1, F_2 \ldots F_n$ that have corresponding feature values of $X_1, Y_1 \ldots Z_1$. Entry $A_2$ is comprised of features $F_1, F_2 \ldots F_n$ that have corresponding feature values of $X_2, Y_2 \ldots Z_2$. Entry $A_n$ is comprised of features $F_1, F_2 \ldots F_n$ that have corresponding feature values of $X_n, Y_n \ldots Z_n$. In some embodiments, a feature value may correspond to the actual value of a feature (e.g., temperature=98°). In other embodiments, a feature value may correspond to one of the ranges of values or a category (e.g., a value of "2" indicates a bank account balance of $100K-$200K). In other embodiments, a feature value may correspond to one of the possible non-numerical values (e.g., "0"=male, "1"=female). In other embodiments, the feature value may be a text string (e.g., "red," "yellow").

Second dataset 204 also includes entries $A_1, A_2 \ldots A_n$. Each entry is comprised of one or more features having a corresponding feature value. In this example, entry $A_1$ is comprised of features $F_1, F_{n+1} \ldots F_{n+n}$ that have corresponding feature values of $XX_1, YY_1 \ldots ZZ_1$. Entry $A_2$ is comprised of features $F_1, F_{n+1} \ldots F_{n+n}$ that have corresponding feature values of $XX_2, YY_2 \ldots ZZ_2$. Entry $A_n$ is comprised of features $F_1, F_{n+1} \ldots F_{n+n}$ that have corresponding feature values of $XX_n, YY_n \ldots ZZ_n$.

In the example shown, entries $A_1, A_2 \ldots A_n$ are found in both the first dataset 202 and the second dataset 204. In other embodiments, some of the entries of first dataset 202 are also found in the second dataset 204. In other embodiments, none of the entries of first dataset 202 are found in the second dataset 204.

First dataset 202 may store data using a first ontology. Second dataset 204 may store data using a second ontology. In the example shown, first dataset 202 and second dataset 204 both include a feature $F_1$ and corresponding feature values. In some embodiments, the feature values associated with a feature may not be in the same format across different datasets. For example, $F_1$ may correspond to a location feature. First dataset 202 may store feature values associated with $F_1$ as GPS coordinates. Second dataset 204 may store feature values associated with $F_2$ as a five-digit zip code. In other embodiments, the feature values associated with a feature are stored in the same format across different databases. For example, $F_1$ may correspond to a weight feature. Both first dataset 202 and second dataset 204 may store feature values associated with $F_1$ in pounds.

In some embodiments, an entry may be associated with a predication label (not shown). The predication label may provide an indication that indicates whether an entry is associated with a predicted behavior. For example, an entry may correspond to a sensor and a predication label may provide an indication prediction whether the sensor is exhibiting abnormal behavior. The prediction label may indicate whether a corresponding entry is indicative of a particular outcome (e.g., money laundering, diagnosis of heart disease). The prediction label may indicate a probability that a corresponding entry is associated with a particular property (e.g., 80% chance of being married).

Figure 2B:
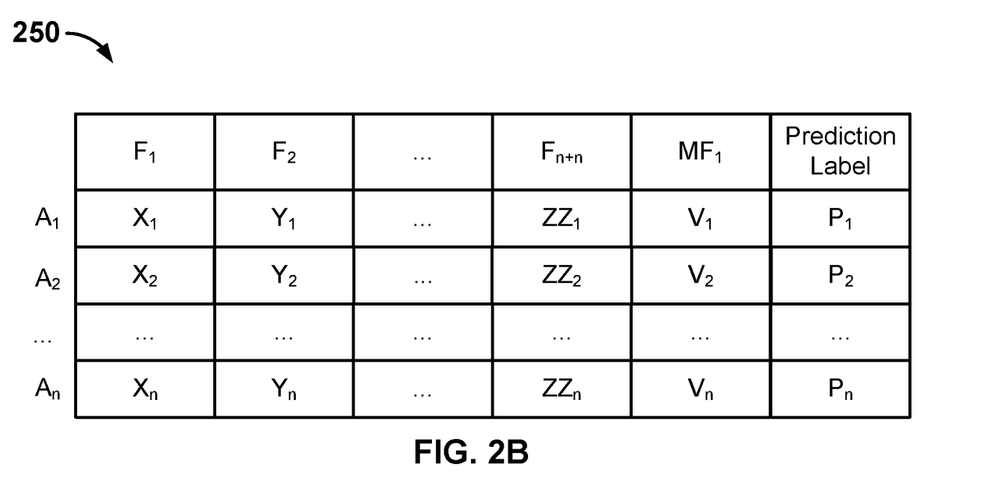
FIG. 2B is a diagram illustrating an embodiment of a combined dataset.

FIG. 2B is a diagram illustrating an embodiment of a combined dataset. Combined dataset 250 may be generated and stored by a platform, such as model generation platform 120.

A combined dataset that is based on a common ontology may be generated by combining one or more datasets together. Entries from different datasets may be combined to generate a single entry. For example, combined dataset 250 includes entries $A_1, A_2 \ldots A_n$. Each entry is comprised of one or more features having a corresponding feature value. The features associated with an entry of combined dataset 250 may include features associated with input dataset 202 and features associated with input dataset 204. For example, entry $A_1$ of combined dataset 250 is associated with features $F_1, F_2 \ldots F_{n+n}$, which include features $F_1, F_2 \ldots F_n$ from input dataset 202 and features $F_1, F_{n+1} \ldots F_{n+n}$ from input dataset 204.

Entries from different datasets may be merged to form a single entry in the event the entry is associated with the same entity. Entries may be determined to be associated with the same entity, for example, in the event the entries have the same one or more pieces of identifying information (e.g., name, social security number, birthdate, address, DNA information, fingerprint information, biometric data, etc.).

In some embodiments, entries from different datasets are combined, but the feature values associated with a feature have different formats. For example, feature $F_1$ of input datasets 202, 204 may correspond to a name feature. Input dataset 202 may store the feature value associated with the name feature in a "first name last name" format while input dataset 204 may store the feature value associated with the name feature in a "last name, first name, middle initial" format. In some embodiments, a format that is compatible with both datasets is selected. For example, a "first name last name" format may be selected for a name feature because both input datasets 202, 204 have the necessary information for the selected format. In other embodiments, the feature values associated input datasets are transformed to a format specified by a common ontology associated with the combined dataset. For example, a common ontology may have a "last name first name" format for a name feature.

In some embodiments, combined dataset 250 may be modified to include one or more metadata features (e.g., $MF_1$) that are generated from time-series data associated with a device. For example, time-series data may be received from an ECG device. Metadata feature generator 122 may generate metadata features associated with the time-series data, such as, heart rate, heart rate variation, PQRST slope, etc. An entry may correspond to a particular patient. The feature value for $MF_1$ may correspond to the heart rate value, heart rate variation value, or PQRST slope of the particular patient. The generated metadata features and corresponding feature values may be associated with an entity and stored at model generation platform 120.

Combined dataset 250 may be sorted into training data and validation data. In some embodiments, a number of entries that are used as training data is greater than the number of entries that are used as validation data. In other embodiments, the number of entries that are used as training data is equal to the number of entries that are used as validation data. In other embodiments, the number of entries that are used as validation data is greater than the number of entries that are used as training data.

One or more entries of combined dataset 250 may correspond to training data. The one or more entries of training data may have a corresponding prediction label. A machine learning model may be trained to output a prediction that matches the prediction labels associated with the entries. The machine learning model may be retrained based on the comparison, for example, to fine tune the machine learning model to make a prediction that is closer to the prediction label. In some embodiments, one or more weights associated with the machine learning model are tuned to improve the accuracy of the machine learning model. For example, one or more weights associated with the one or more features included in the machine learning model may be dynamically tuned to improve the accuracy of the machine learning model.

One or more entries of combined dataset 250 may correspond to validation data. The one or more entries of validation data may have a corresponding prediction label. A trained machine learning model may be validated to see if its corresponding prediction label matches a predication label included in the input dataset. A machine learning machine may be validated in the event a validation score associated with its predication labels is greater than or equal to a validation score threshold. Otherwise, the machine learning model is retrained.

Figure 3:
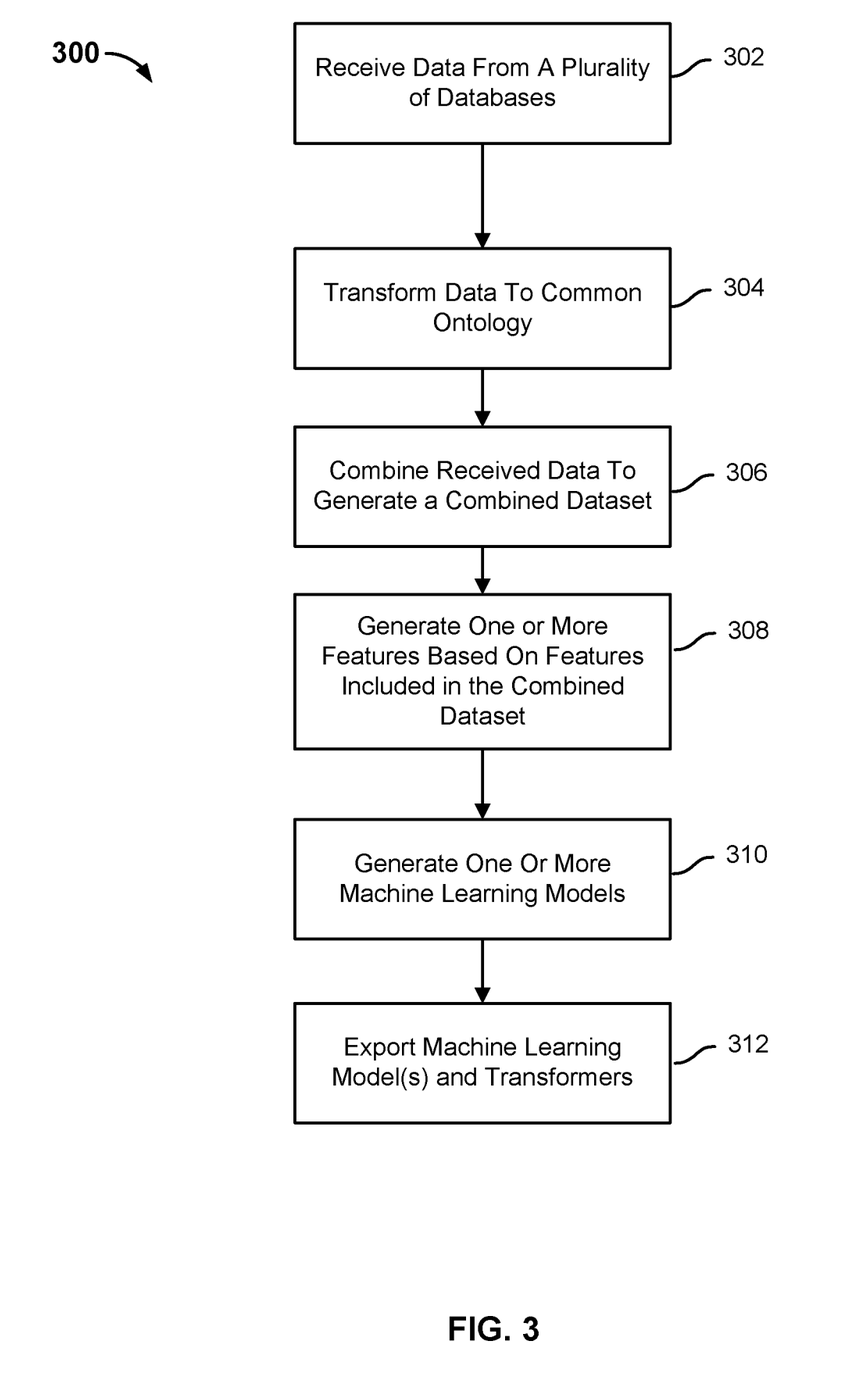
FIG. 3 is a flow chart illustrating an embodiment of a process for generating an exportable machine learning model.

FIG. 3 is a flow chart illustrating an embodiment of a process for generating an exportable machine learning model. In the example shown, process 300 may be performed by a model platform, such as model generation platform 120.

At 302, data is received from a plurality of sources. In some embodiments, data is received from a plurality of different databases. In some embodiments, data may be received from multiple types of devices (e.g., IoT devices, sensors, medical devices, etc.). The data may include time series data from a device.

At 304, the data is transformed to a common ontology. The data associated with a plurality of databases may be transformed to a common ontology using one or more transformers to transform the data to a common format. A transformer may be selected based on a data type and/or format associated with a feature value of a feature. To ensure a machine learning model is trained on consistent feature values, one or more transformers may be applied to feature values to transform the feature values to a common format. A transformer may be selected based on a source of the data.

At 306, the received data is combined to generate a combined dataset. The combined dataset is based on the common ontology. In some embodiments, entries from different datasets may be combined to generate a single entry. Entries may be determined to be associated with the same entity, for example, in the event the entries have the same one or more pieces of identifying information (e.g., name, social security number, birthdate, address, DNA information, fingerprint information, biometric data, etc.). In other embodiments, entries from different datasets may not be combined (e.g., associated with different entities) and a plurality of entries are generated for the combined dataset. In some embodiments, entries from different datasets are combined, but the feature values associated with a feature have different formats. In some embodiments, a format that is compatible with both datasets is selected. In other embodiments, the feature values associated input datasets are transformed to a format specified by the common ontology associated with the combined dataset. An entry associated with combined dataset may be modified to include one or more metadata features (e.g., $MF_1$) that are generated from time-series data associated with a device.

At 308, one or more features are generated based on one or more features included in the combined dataset. One or more transformers may be applied to the combined dataset to generate the one or features. A transformation performs an operation on one or more features to create a new feature. For example, a transformation may perform an operation that combines the features values associated with two different features to create a new feature. The transformation may be selected based on a data type and/or format associated with a feature value of the one or more important features. A data type associated with a feature value may be a float value, an integer value, an ordinal value, a categorical value, a string, etc. A format associated with a feature may be "MM/DD/YYYY" or "kgs." A transformation may use a string as an input and an important feature that has a string value for a feature value may be selected. The transformation may be randomly selected.

At 308, one or more machine learning models are generated. In some embodiments, a feature in the combined dataset is selected as a feature for which a machine learning model will make a prediction. In other embodiments, a feature not included in the combined dataset is selected as a feature for which a machine learning model will make a prediction. The selected feature is a feature for which a machine learning model will be trained to predict a corresponding feature label (e.g., feature value).

The combined dataset may be sorted into training data and validation data. A set of features and corresponding feature values are used to train a machine learning model. In some embodiments, the set of features includes a subset of the features associated with the combined dataset. In some embodiments, the set of features includes one or more new features generated from the features included in the combined dataset. In some embodiments, the set of features includes a combination of the subset of features associated with the combined dataset and one or more new features generated from the features associated with the combined dataset.

A machine learning model may be generated using a machine learning algorithm, such as decision trees, naïve bayes classification, least squares regression, logistic regression, support vector machines, neural networks, deep learning, gradient boosting machine, generalized linear model, mathematical average, etc. A machine learning model is trained using training data that is comprised of a plurality of entries having a set of features and corresponding feature values. A machine learning model may be tuned to better match the prediction labels associated with the training data. For example, one or more weights associated with the one or more features included in the machine learning model may be dynamically tuned to improve the accuracy of the machine learning model.

Validation data included in the combined may be used to validate a trained machine learning model. The validation data may verify the accuracy of the trained machine learning model. A machine learning model may undergo one or more iterations of training/validation until a threshold validation score (e.g., accuracy) is reached.

At 310, the one or more machine learning models and associated transformers are exported. The one or more machine learning models and associated transformations may be provided to a middle layer application via an API. The one or more machine learning models and associated transformers may be provided in a model object optimized (MOJO) file. A code library and associated language bindings may be provided with the machine learning model and associated transformers. The one or more machine learning models and associated transformers may be exported to an appliance.

Figure 4:
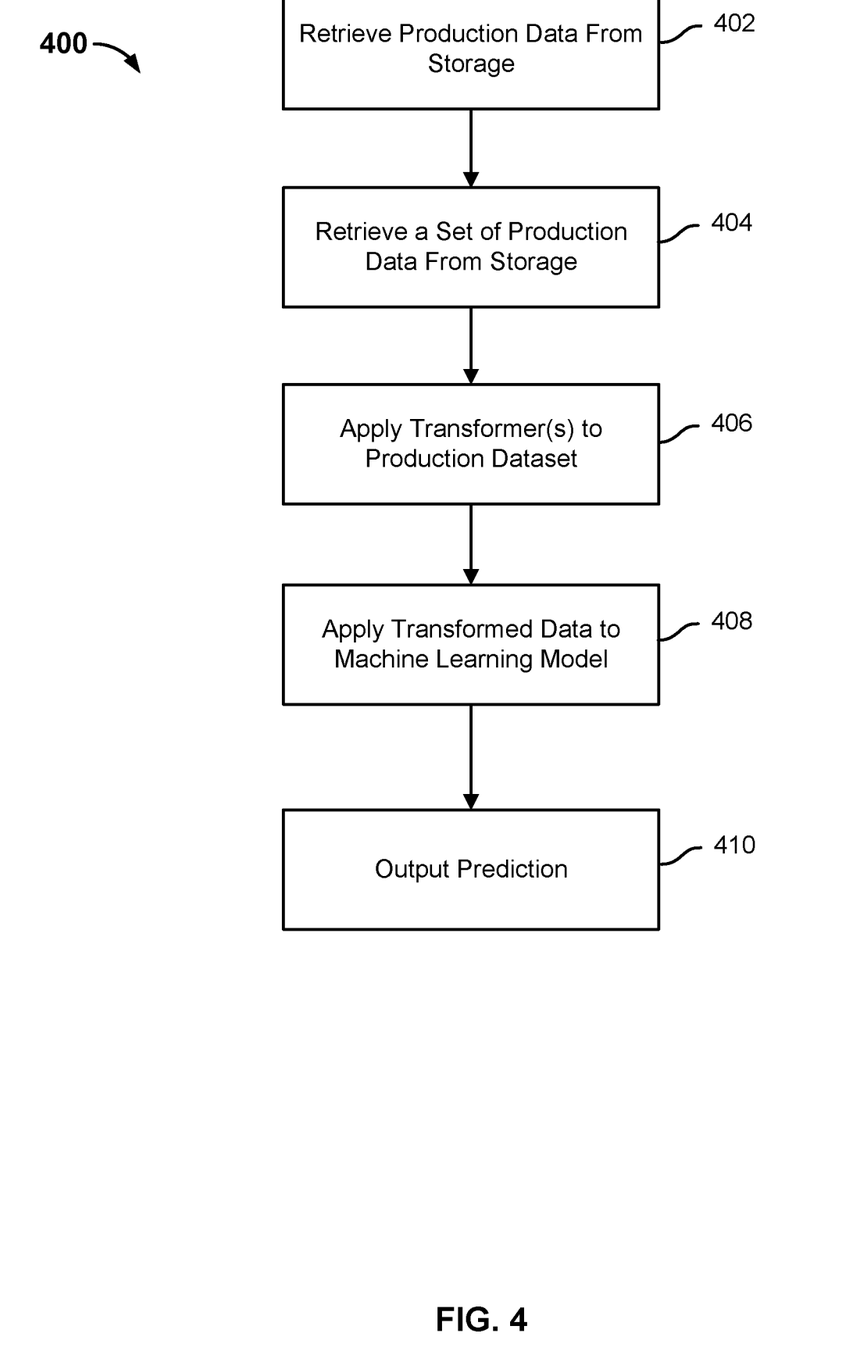
FIG. 4 is a flow chart illustrating an embodiment of a process for generating a prediction.

FIG. 4 is a flow chart illustrating an embodiment of a process for generating a prediction. In the example shown, process 400 may be performed by a remote device, such as remote device 130.

At 402, one or more machine learning models and associated transformers are received. The one or more machine learning models and associated transformers may be received at a middle layer application via an API. The one or more machine learning models and associated transformers may be received in a model object optimized (MOJO) file. A code library and associated language bindings may be received with the one or more machine learning models and associated transformers.

At 404, a set of production data is retrieved from storage. The production dataset includes one or more entries that associated with a plurality of features having corresponding feature values. The one or more entries included in the production dataset do not include corresponding predictions labels. In some embodiments, the production data is imported into the machine learning model using a flow, such as H2O Flow. The flow may allow one or more entries of production data to be modified, rearranged, or saved to a library. Each entry contains an input field that allows a user to enter commands, define functions, call other functions, and access other cells or objects on the page.

At 406, one or more transformers of the received transformers are applied to the production dataset. The feature values associated with the features of the production data may be analyzed to determine a data type and/or format associated with a feature value. A received transformer may be selected and applied to the feature values associated with a feature based at least in part on a data type and/or format associated with the feature value. Applying the transformers to the production data transforms the production data into a format useable by the one or more received machine learning models. In some embodiments, a transformer is not applied to the feature values associated with a feature of the production data because the feature values are already in a format associated with the common ontology. In some embodiments, a transformer is selected based on an identity of the remote device. For example, a first transformer may be selected to be applied to feature values associated with a feature for a first remote device and a second transformer may be selected to be applied to feature values associated with the feature for a second remote device.

At 408, the transformed data is applied to a machine learning model. The machine learning model is configured to output a prediction label based in part on the transformed data. In some embodiments, some of the production data is not transformed because the feature values associated with one or more features comply with the common ontology. The transformed data and the production data that complies with the common ontology may be applied to the machine learning model.

At 410, a prediction is outputted. The prediction label may indicate whether a corresponding entry is indicative of a particular outcome (e.g., money laundering, diagnosis of heart disease). The prediction label may indicate a probability that a corresponding entry is associated with a particular property (e.g., 80% chance of being married).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
receiving data from a plurality of data sources from a plurality of databases;
transforming, using one or more transformers, data received from the plurality of data sources into a format having a common ontology, wherein the plurality of data sources includes a first data source and a second data source, wherein the first data source is different from the second data source, wherein the transforming of the data received from the plurality of data sources comprises:
transforming, using a transformer of the one or more transformers, a first format type of first data received from the first data source of the plurality of data sources to be in a second format type of second data received from the second data source of the plurality of data sources;

combining the data received from the plurality of data sources into a combined dataset, comprising:
  combining the transformed first data and the second data to obtain the combined dataset, wherein combined dataset is in the second format type;
generating one or more new features based on the transformed data received from the data sources for the combined dataset;
training one or more machine learning models based at least in part on the transformed data to output a prediction label for the one or more new features, wherein the prediction label for the one or more new features has an accuracy above a threshold accuracy;
training, using the one or more transformers, the one or more machine learning models, wherein a code library and an associated set of language bindings are provided with the one or more machine learning models and the one or more transformers; and
loading, using a remote device, the one or more machine learning models into an application using the code library to generate a prediction, wherein the remote device includes the application written in a different programming language than the code library written in a first programming language, wherein the set of language bindings enable the code library written in the first programming language to be used in different programming language of the application, wherein the one or more machine learning models and the one or more transformers enable the application hosted on the remote device to make predictions for which the application was previously not configured after being loaded into the remote device, wherein the loading of the one or more machine learning models comprises:
  receiving, using the remote device, the one or more machine learning models and the one or more transformers;
  retrieving, using the remote device, production data from storage;
  applying, using the remote device, the one or more transformers to the production data;
  applying, using the remote device, the transformed production data to the one or more machine learning models, wherein the one or more machine learning models is configured to output a prediction label based on the transformed production data without having to re-write the application; and
  outputting, using the remote device, the prediction based in the outputted prediction label.

2. The method of claim 1, wherein the plurality of databases store data using a corresponding ontology.

3. The method of claim 2, wherein the corresponding ontology of at least one of the plurality of databases is different than the common ontology.

4. The method of claim 1, wherein the production data is transformed using at least one of a filter transformer, a frequent transformer, a bulk interactions transformer, a truncated singular value decomposition (SVD) numeric transformer, a cross validation target encoding, cross validation categorical to numeric encoding transformer, a dates transformer, a date polar transformer, a text transformer, a categorical target encoding transformer, a numeric to categorical target encoding transformer, a cluster target encoding transformer, a cluster distance transformer, a weight of evidence, and/or a numeric to categorical weight of evidence transformer.

5. The method of claim 1, wherein the remote device is configured to transform the production data into the common ontology using the one or more transformers.

6. The method of claim 5, wherein to transform the production data into the common ontology using the one or more transformers, the remote device is further configured to:
  analyze features and corresponding feature values associated with the production data;
  determine a format type associated with the corresponding feature values; and
  select one of the one or more transformers based on the determined format type.

7. The method of claim 1, wherein the one or more machine learning models are selected based at least in part on a type of prediction to be performed by the remote device.

8. The method of claim 1, further comprising receiving the production data associated with one or more data sources from one or more devices.

9. The method of claim 1, wherein the production data associated with the one or more data sources includes time-series data.

10. The method of claim 9, further comprising generating one or more metadata features based on the time-series data.

11. The method of claim 10, wherein one or more machine learning models are based at least in part on the one or more metadata features.

12. The method of claim 1, wherein at least one of the one or more machine learning models is trained utilizing a neural network.

13. The method of claim 1, wherein a first new feature of the one or more new features is based on a first feature associated with a first data source of the plurality of data sources and a second feature associated with a second data source of the plurality of data sources.

14. A system, comprising:
a processor configured to:
  receive data from a plurality of data sources from a plurality of databases;
  transform, using one or more transformers, data received from the plurality of data sources into a format having a common ontology, wherein the plurality of data sources includes a first data source and a second data source, wherein the first data source is different from the second data source, wherein the transforming of the data received from the plurality of data sources comprises to:
    transform, using a transformer of the one or more transformers, a first format type of first data received from the first data source of the plurality of data sources to be in a second format type of second data received from the second data source of the plurality of data sources;
  combine the data received from the plurality of data sources into a combined dataset, comprising to:
    combine the transformed first data and the second data to obtain the combined dataset, wherein combined dataset is in the second format type;
  generate one or more new features based on the transformed data received from the data sources for the combined dataset;
  train one or more machine learning models based at least in part on the transformed data to output a prediction label for the one or more new features, wherein the prediction label for the one or more new features has an accuracy above a threshold accuracy;

train, using the one or more transformers, the one or more machine learning models, wherein a code library and an associated set of language bindings are provided with the one or more machine learning models and the one or more transformers; and load, using a remote device, the one or more machine learning models into an application using the code library to output a prediction, wherein the remote device includes the application written in a different programming language than the code library written in a first programming language, wherein the set of language bindings enable the code library written in the first programming language to be used in different programming language of the application, wherein the one or more machine learning models and the one or more transformers enable the application hosted on the remote device to make predictions for which the application was previously not configured after being loaded into the remote device, wherein the loading of the one or more machine learning models comprises to:

receive, using the remote device, the one or more machine learning models and the one or more transformers;

retrieve, using the remote device, production data from storage;

apply, using the remote device, the one or more transformers to the production data;

apply, using the remote device, the transformed production data to the one or more machine learning models, wherein the one or more machine learning models is configured to output a prediction label based on the transformed production data without having to re-write the application; and output, using the remote device, the prediction based in the outputted prediction label; and a memory coupled to the processor and configured to provide the processor with instructions.

15. The system of 14, wherein the remote device is configured to transform the production data into the common ontology using the one or more transformers.

16. A computer program product, the computer program product being embodied in a non-transitory computer readable storage medium and comprising computer instructions for:

receiving data from a plurality of data sources from a plurality of databases;

transforming, using one or more transformers, data received from the plurality of data sources into a format having a common ontology, wherein the plurality of data sources includes a first data source and a second data source, wherein the first data source is different from the second data source, wherein the transforming of the data received from the plurality of data sources comprises:

transforming, using a transformer of the one or more transformers, a first format type of first data received from the first data source of the plurality of data sources to be in a second format type of second data received from the second data source of the plurality of data sources;

combining the data received from the plurality of data sources into a combined dataset, comprising:

combining the transformed first data and the second data to obtain the combined dataset, wherein combined dataset is in the second format type;

generating one or more new features based on the transformed data received from the data sources for the combined dataset;

training one or more machine learning models based at least in part on the transformed data to output a prediction label for the one or more new features, wherein the prediction label for the one or more new features has an accuracy above a threshold accuracy;

training, using the one or more transformers, the one or more machine learning models, wherein a code library and an associated set of language bindings are provided with the one or more machine learning models and the one or more transformers; and loading, using a remote device, the one or more machine learning models into an application using the code library to output a prediction, wherein the remote device includes the application written in a different programming language than the code library written in a first programming language, wherein the set of language bindings enable the code library written in the first programming language to be used in different programming language of the application, wherein the one or more machine learning models and the one or more transformers enable the application hosted on the remote device to make predictions for which the application was previously not configured after being loaded into the remote device, wherein the loading of the one or more machine learning models comprises:

receiving, using the remote device, the one or more machine learning models and the one or more transformers;

retrieving, using the remote device, production data from storage;

applying, using the remote device, the one or more transformers to the production data;

applying, using the remote device, the transformed production data to the one or more machine learning models, wherein the one or more machine learning models is configured to output a prediction label based on the transformed production data without having to re-write the application; and outputting, using the remote device, the prediction based in the outputted prediction label.

* * * * *